United States Patent [19]

Schurter et al.

[11] Patent Number: 5,176,178
[45] Date of Patent: Jan. 5, 1993

[54] ACCUMULATOR WITH RANDOMLY UNIPLANAR BLADDER COLLAPSE

[75] Inventors: Robert M. Schurter, Elm Grove, Wis.; Robert H. Palmerton, New Dundee, Canada

[73] Assignee: AOS Holding Company, Wilmington, Del.

[21] Appl. No.: 839,289

[22] Filed: Feb. 26, 1992

Related U.S. Application Data

[63] Continuation of Ser. No. 658,119, Feb. 20, 1991, abandoned.

[51] Int. Cl.⁵ .............................................. F16L 55/04
[52] U.S. Cl. ..................... 138/30; 220/403; 220/720
[58] Field of Search ............... 138/26, 30; 220/85 B, 220/403, 720, 723; 417/540

[56] References Cited

U.S. PATENT DOCUMENTS

| | | |
|---|---|---|
| Re. 20,887 | 10/1938 | Mercier . |
| 356,997 | 2/1887 | Gil . |
| 2,283,439 | 5/1942 | Herman . |
| 2,324,701 | 7/1943 | Herman .............................. 220/85 B |
| 2,331,921 | 10/1943 | Mercier . |
| 2,349,321 | 5/1944 | White . |
| 2,360,590 | 10/1944 | Schweller . |
| 2,380,866 | 7/1945 | Overbeke . |
| 2,389,792 | 11/1945 | Lippincott ............................ 138/30 |
| 2,397,796 | 4/1946 | Lippincott ............................ 138/30 |
| 2,421,076 | 5/1947 | Linton ................................... 138/30 |
| 2,465,908 | 3/1949 | Mercier ................................. 138/30 |
| 2,480,558 | 8/1949 | De Kiss ................................. 138/30 |
| 2,543,585 | 2/1951 | Miller ................................... 138/30 |
| 2,742,785 | 4/1956 | St. Clair ............................... 138/30 |
| 2,893,433 | 7/1959 | MacDuff . |
| 3,213,913 | 10/1965 | Petriello ............................ 220/85 B |
| 3,236,411 | 2/1966 | Lander et al. ..................... 220/85 B |
| 3,339,803 | 9/1967 | Wayne et al. . |
| 3,425,593 | 2/1969 | Kramer et al. . |
| 3,960,178 | 6/1976 | Mercier . |
| 4,010,773 | 3/1977 | Bihlmaier . |
| 4,098,297 | 7/1978 | Zahid . |
| 4,234,016 | 11/1980 | Horino . |
| 4,474,215 | 10/1984 | Richter et al. . |
| 4,667,841 | 5/1987 | Belle ................................... 220/85 B |
| 4,826,045 | 5/1989 | Price et al. . |

FOREIGN PATENT DOCUMENTS 569648 6/1945 United Kingdom ................. 138/30

*Primary Examiner*—James E. Bryant, III

[57] ABSTRACT

An accumulator (10) has a freely movable, flexible and deformable bladder (20) with a single relatively rigid ring (40) stationarily secured thereto and defining a circle on the bladder which remains substantially uniplanar with itself during the flexing and deforming movement of the bladder but moves with the bladder along variable deformation planes of random orientation. The bladder freely and randomly flexes and deforms such that the circle is randomly oriented along random and varying planes during movement of the bladder during a cycle.

15 Claims, 2 Drawing Sheets

ACCUMULATOR WITH RANDOMLY UNIPLANAR BLADDER COLLAPSE

This application is a continuation of application Ser. No. 07/658,119, filed on Feb. 20, 1991, now abandoned.

BACKGROUND AND SUMMARY

The invention arose during continuing development efforts in improving accumulators or pressure vessels such as shown in U.S. Pat. No. 4,474,215 and allowed U.S. application Ser. No. 07/399,596, filed Aug. 25, 1989, incorporated herein by reference. The invention more particularly relates to improvements in the manner of collapse of the bladder or diaphragm.

An accumulator accumulates a fluid for later usage. For example, in residences having a well, the water pump pumps water into the accumulator which holds the water for later supply to a faucet or the like, without requiring the pump to be turned back on. The accumulator typically comprises a cylindrical vessel having top and bottom ends and a cylindrical sidewall extending axially therebetween. A resilient flexible bladder is disposed within the vessel and has a peripheral edge stationarily secured to the cylindrical sidewall. The bladder separates the vessel into variable volume upper and lower chambers. The bladder is flexibly and deformably movable upwardly and downwardly to increase and decrease the volumes of the upper and lower chambers. For example, when water is pumped into the lower chamber, the bladder moves upwardly and compresses the air in the upper chamber. The pressurized air in the upper chamber is thus available to push the bladder downwardly at a later time when the faucet is turned on.

The present invention arose out of efforts to extend bladder life in applications where the bladder is subject to severe deformation causing cusps which in turn cause high bladder failure rates. In the prior art, problems of buckling or canting of the bladder occurring during collapsing movement have generally been attributed to disorganized movement. Such prior art attempts to prevent disorderly collapse or uncontrolled movement during expulsion, and instead attempts to control such movement, to provide orderly collapse. In contrast, the present invention intentionally permits disorderly collapse during expulsion and permits free and random flexing and deformation of the bladder along randomly oriented and varying planes.

In the present invention, it has been found that the cusp problem is solved by providing a single relatively rigid ring stationarily secured to the bladder and defining a circle on the bladder, wherein during the flexing and deforming movement of the bladder, the circle remains substantially uniplanar with itself but moves with the bladder along variable deformation planes of random orientation. The bladder freely and randomly flexes and deforms such that the circle is randomly oriented along random and varying planes during movement of the bladder during a cycle, and such that the random movement of the plane of the circle randomly varies from cycle to cycle.

DETAILED DESCRIPTION

Figure 1:
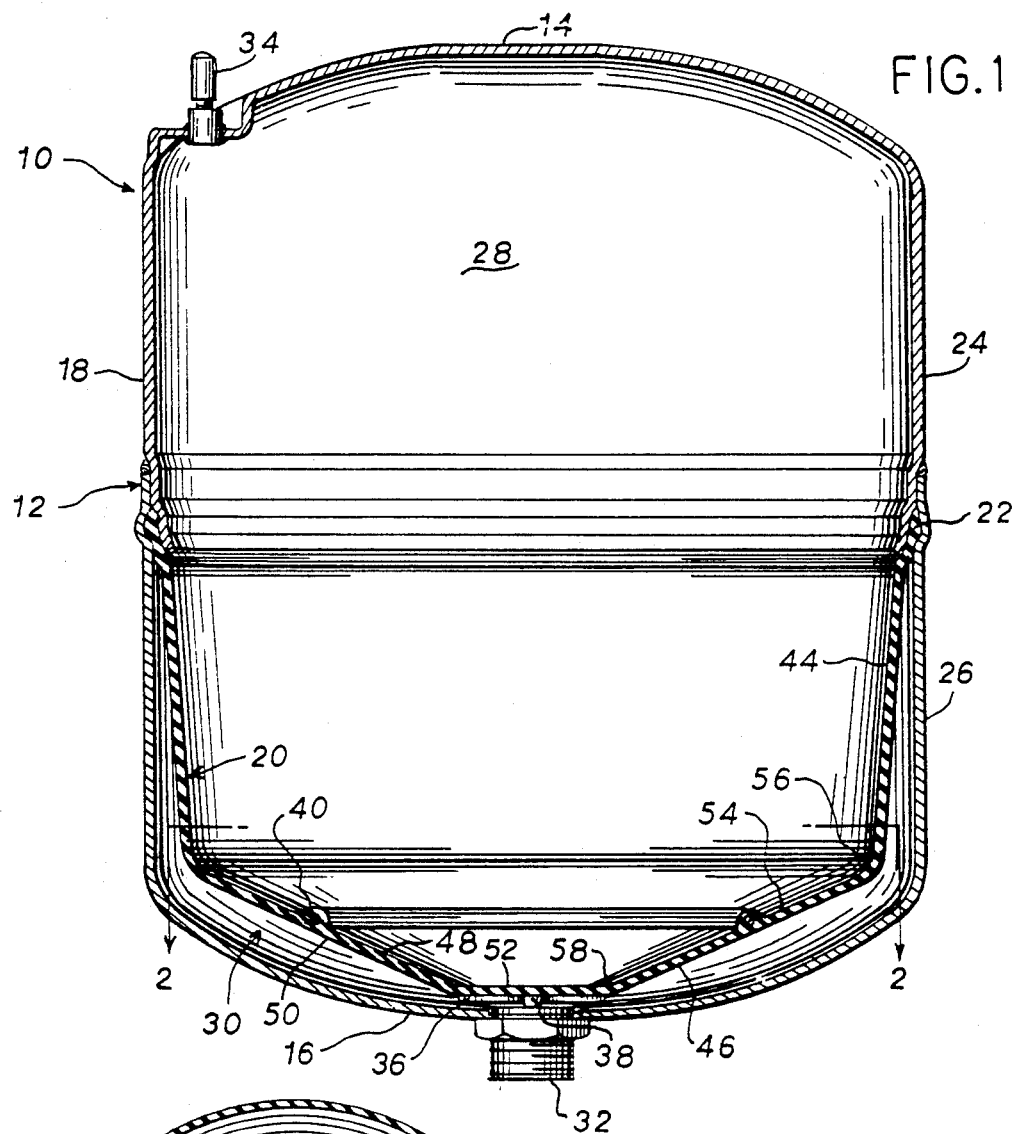
FIG. 1 is a side elevation view, partly broken away, of an accumulator in accordance with the invention.
Figure 2:
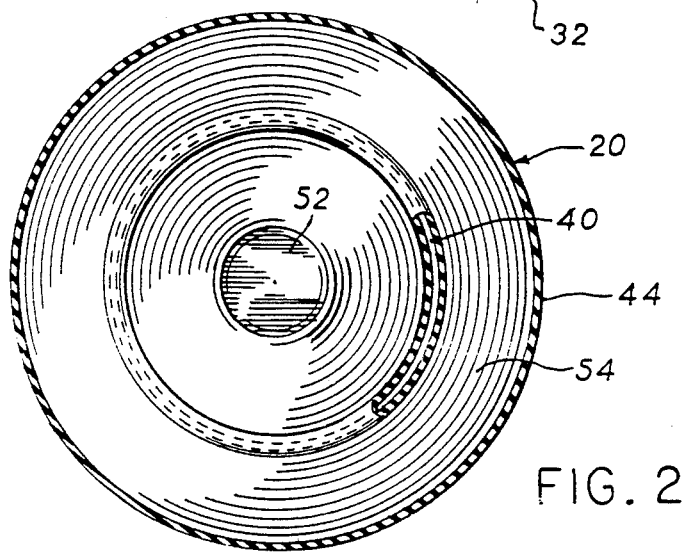
FIG. 2 is a sectional view taken along line 2—2 of FIG. 1.

FIG. 1 shows an accumulator 10 comprising a cylindrical vessel 12 having top and bottom ends 14 and 16 and a cylindrical sidewall 18 extending axially therebetween. A flexible resilient rubber bladder 20 is disposed within the vessel and has a peripheral edge 22 stationarily secured to the cylindrical sidewall of the vessel. In preferred form, the vessel is like that shown in above incorporated allowed U.S. application Ser. No. 07/399,596, and has upper and lower cylindrical vessel shells 24 and 26 having facing open mouths received one within the other in partially overlapping telescoped relation compressing and sealing peripheral edge 22 of the bladder therebetween.

Bladder 20 separates the vessel into variable volume upper and lower chambers 28 and 30. The bladder is flexibly and deformably movable upwardly toward top end 14, FIGS. 3-5, to decrease the volume of upper chamber 28 and increase the volume of lower chamber 30. The bladder is flexibly and deformably movable downwardly toward bottom end 16 to decrease the volume of lower chamber 30 and increase the volume of upper chamber 28.

In operation, a fluid such as water is pumped into chamber 30 through port 32 which causes bladder 20 to move upwardly and compress the air in chamber 28. The pressurized air in chamber 28 is thus available to push bladder 20 downwardly when fluid is no longer being pumped in through port 32, which downward movement of bladder 20 pushes water in chamber 30 out through port 32. For example, in residences having a well, the water pump pumps water through port 32 into chamber 30 which holds the water for latter supply to a faucet or the like, without requiring the pump to be turned back on. Chamber 28 is provided with an air pressurizing valve 34, as known in the prior art. The bottom of bladder 20 is provided with a plate 36 having a lower boss 38 extending across the port opening and spacing the bladder slightly above the port opening, as known in the prior art.

In the present invention, a single relatively rigid ring 40 is stationarily secured to bladder 20, preferably by being molded thereto, and defines a circle on the bladder. During the flexing and deforming movement of the bladder, the circle defined by ring 40 remains substantially uniplanar with itself but moves with the bladder along variable deformation planes of random orientation, FIGS. 3-5.

Figure 5:
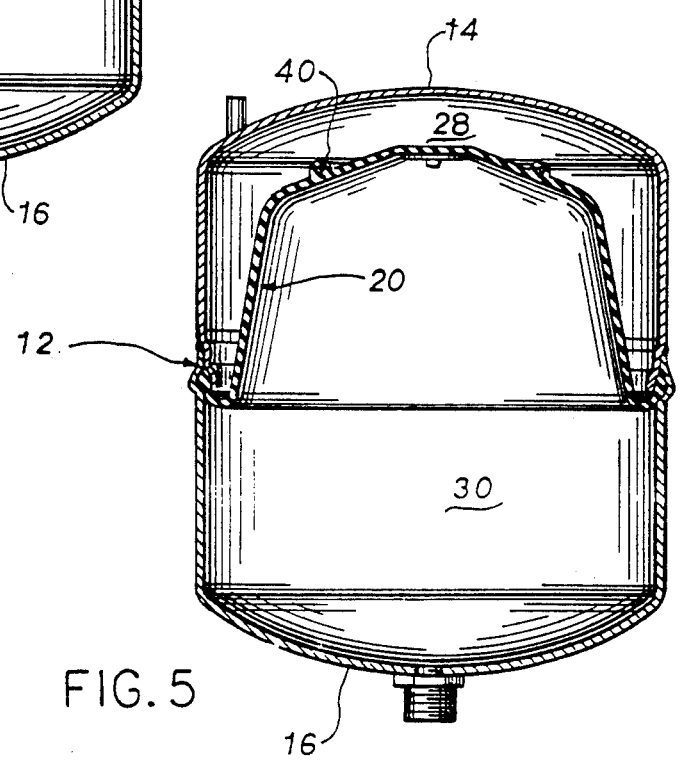
FIG. 5 is a view like FIG. 4 and shows the bladder in the upper position.

The bladder has a lower position as shown in FIG. 1 minimizing the volume of lower chamber 30 and maximizing the volume of upper chamber 28. The bladder has an upper position as shown in FIG. 5 minimizing the volume of upper chamber 28 and maximizing the volume of lower chamber 30. The bladder moves from the lower position to the upper position and back to the lower position to complete a cycle of movement, and repeats such movement through plural cycles. The bladder freely and randomly flexes and deforms such that the circle defined by ring 40 is randomly oriented along random and varying planes during movement of the bladder during a cycle.

Figure 3:
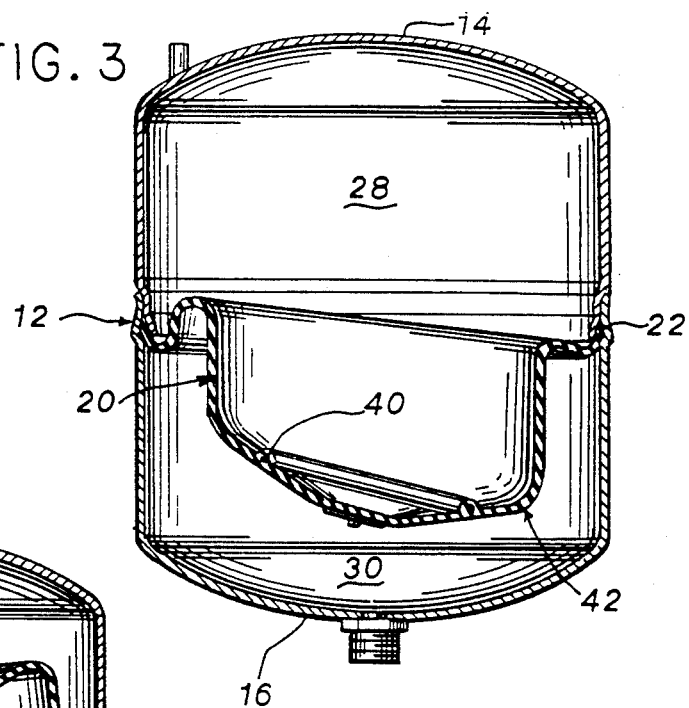
FIG. 3 is a reduced view like FIG. 1 and shows movement of the bladder.
Figure 4:
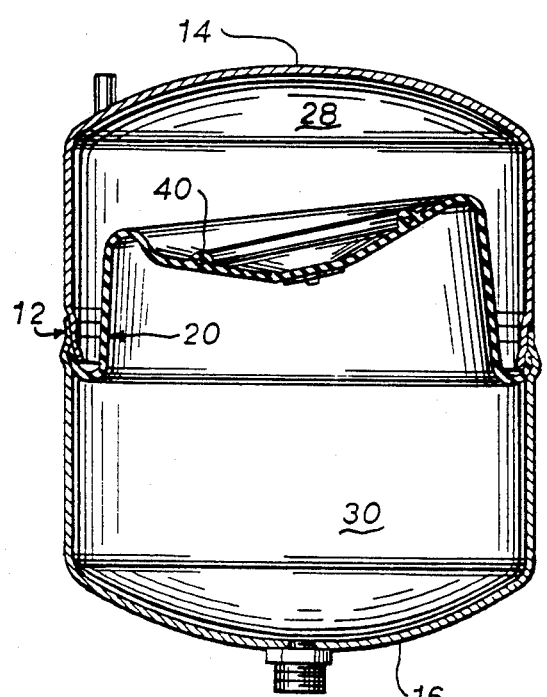
FIG. 4 is a view like FIG. 3 and shows further movement of the bladder.

Bladder 20 flexes and deforms substantially only along surfaces such as 42, FIG. 3, outside of the circle defined by ring 40. Surfaces 42 are free to randomly flex and deform such that the circle is randomly oriented along random and varying planes during movement of the bladder during a cycle, and from cycle to cycle. Surfaces 42 extend all the way from the circle to peripheral edge 22.

Bladder 20 is a generally cup-shaped member having a sidewall 44 extending between an end wall 46 and peripheral edge 22. End wall 46 has an upper facing surface 48 facing chamber 28, and a lower facing surface 50 facing chamber 30. Ring 40 is on upper facing surface 48. End wall 46 has a central portion 52, and a tapered portion 54 extending from central portion 52 to sidewall 44. Ring 40 is secured to the bladder along tapered portion 54. The bladder has an upper position as shown in FIG. 5 with end wall 46 moved upwardly toward top end 14 of the vessel minimizing the volume of upper chamber 28 and maximizing the volume of lower chamber 30. The bladder has a lower position as shown in FIG. 1 with end wall 46 moved downwardly toward bottom end 16 of the vessel minimizing the volume of lower chamber 30 and maximizing the volume of upper chamber 28. In the lower position of the bladder as shown in FIG. 1, sidewall 44 of the bladder extends downwardly and slightly inwardly, and tapered portion 54 of end wall 46 of the bladder is frustoconically tapered from an outer diameter at a junction 56 with sidewall 44 to an inner diameter at junction 58 with central portion 52 of the end wall. The entire length of sidewall 44 between peripheral edge 22 and junction 56 is free to randomly flex and deform. Ring 40 is spaced from junction 56, and the section of frustoconically tapered portion 54 between ring 40 and junction 56 is free to randomly flex and deform. Ring 40 has a diameter less than the outer diameter of frustoconically tapered portion 54 at junction 56, and greater than the inner diameter of frustoconically tapered portion 54 at junction 58. In preferred form, ring 40 is located substantially at the midpoint of frustoconically tapered portion 54 such that the diameter of ring 40 is the average of the noted outer and inner diameters.

It is recognized that various equivalents, alternatives and modifications are possible within the scope of the appended claims.

We claim:

1. An accumulator comprising a cylindrical vessel having top and bottom ends and a cylindrical sidewall extending therebetween and having an axis, a flexible resilient bladder disposed within said vessel and having a peripheral edge stationarily secured to said cylindrical sidewall in a plane extending generally perpendicularly to said axis, being otherwise unconnected, and including an end portion having a circular perimeter spaced from said perimeter edge at a generally uniform distance, said bladder separating said vessel into variable volume upper and lower chambers, said bladder being flexibly and deformably movable upwardly toward said top end to decrease the volume of said upper chamber and increase the volume of said lower chamber, said bladder being flexibly and deformably movable downwardly toward said bottom end to decrease the volume of said lower chamber and increase the volume of said upper chamber, and only one relatively rigid ring stationarily secured to said perimeter of said end portion of said bladder, wherein during the flexing and deforming movement of said bladder, said ring prevents collapse of said end portion by maintaining the circular shape of said perimeter regardless of the randomly occurring orientation of said ring within said vessel.

2. The invention according to clam 1 wherein said bladder has a lower position minimizing the volume of said lower chamber and maximizing the volume of said upper chamber, and an upper position minimizing the volume of said upper chamber and maximizing the volume of said lower chamber, and wherein said bladder moves from said lower position to said upper position and back to said lower position to complete a cycle of movement, and repeats such movement through plural cycles, and wherein said bladder freely and randomly flexes and deforms such that said circle is randomly oriented along random and varying planes during movement of said bladder during a cycle, and such that the random movement of the plane of said circle randomly varies from cycle to cycle.

3. The invention according to claim 1 wherein said bladder flexes and deforms substantially only along surfaces outside of said circle.

4. The invention according to claim 3 wherein said bladder moves between a lower position minimizing the volume of said lower chamber and maximizing the volume of said upper chamber, and an upper position minimizing the volume of said upper chamber and maximizing the volume of said lower chamber, and wherein said bladder moves from said lower position to said upper position and back to said lower position to complete a cycle of movement, and repeats such movement through plural cycles, and wherein said surfaces are free to randomly flex and deform such that said circle is randomly oriented along random and varying planes during movement of said bladder during a cycle, and from cycle to cycle.

5. The invention according to claim 4 wherein said surfaces free to randomly flex and deform extend all the way from said circle to said peripheral edge.

6. The invention according to claim 1 wherein said bladder is a generally cup-shaped member having a sidewall extending between an end wall and said peripheral edge, said end wall being movable upwardly to minimize the volume of said upper chamber and maximize the volume of said lower chamber, said end wall being movable downwardly to minimize the volume of said lower chamber and maximize the volume of said upper chamber, said ring being located on said end wall.

7. The invention according to claim 6 wherein said end wall comprises a central portion, and a tapered portion extending from said central portion to said sidewall, and wherein said ring is secured to said bladder along said tapered portion of said end wall.

8. The invention according to claim 7 wherein said bladder has a lower position with said end wall moved toward said bottom end of said vessel and minimizing the volume of said lower chamber and maximizing the volume of said upper chamber, and wherein in said lower position of said bladder, said sidewall of said bladder extends downwardly and slightly inwardly, and said tapered portion of said end wall is frustoconically tapered from an outer diameter at a first junction with said sidewall to an inner diameter at a second junction with said central portion of said end wall.

9. The invention according to claim 8 wherein the entire length of said sidewall between said peripheral edge and said first junction is free to randomly flex and deform.

10. The invention according to claim 9 wherein said ring is on said frustoconically tapered portion of said end wall and spaced from said first junction, and wherein the section of said frustoconically tapered portion of said end wall between said ring and said first junction is free to randomly flex and deform.

11. The invention according to claim 8 wherein said ring has a diameter less than said outer diameter and greater than said inner diameter.

12. The invention according to claim 11 wherein said ring is located substantially at the mid-point of said frustoconically tapered portion of said end wall such that said diameter of said ring is the average of said outer and inner diameters.

13. An accumulator comprising a cylindrical vessel having top and bottom ends, and a cylindrical sidewall extending therebetween and having an axis, a flexible resilient bladder disposed within said vessel and separating said vessel into variable volume upper and lower chambers, said bladder being flexibly and deformably movable upwardly toward said top end to an upper position minimizing the volume of said upper chamber and maximizing the volume of said lower chamber, said bladder being flexibly and deformably movable downwardly toward said bottom end to minimize the volume of said lower chamber and maximize the volume of said upper chamber, said bladder moving from said lower position to said upper position and back to said lower position to complete a cycle of movement, and movable through plural cycles of movement, said bladder comprising a generally cup-shaped member having a peripheral edge stationarily secured to said cylindrical sidewall in a plane extending generally perpendicularly to said axis and being otherwise unconnected, a sidewall extending from said peripheral edge, an end wall, and a tapering wall extending between said end wall and said bladder sidewall, said bladder also comprising an end portion including said end wall, a part of said tapering wall, and a circular perimeter spaced from said peripheral edge at a generally uniform distance, said end portion being movable upwardly toward said top end of said vessel and movable downwardly toward said bottom end of said vessel, and only one relatively rigid ring stationarily secured to said tapering wall of said bladder at said circular perimeter of said end portion, said ring being randomly oriented along random and varying planes during flexing and deforming movement of said bladder, and such that the random movement of the plane of said ring randomly varies from cycle to cycle, said ring preventing collapse of said end portion by maintaining the circular shape of said perimeter regardless of the randomly occurring orientation of said ring within said vessel.

14. The invention according to claim 13 wherein the entire length of said sidewall between said peripheral edge and the junction of said tapered portion and said sidewall is free to randomly flex and deform, and wherein the section of said tapered portion between said ring and said junction is free to randomly flex and deform.

15. The invention according to claim 13 wherein said bladder has a lower facing surface facing said lower chamber, which lower chamber receives liquid therein, and wherein said bladder has an upper chamber receiving air therein which is compressed when said bladder moves to said upper position, and wherein said ring is on said upper facing surface of said bladder.

* * * * *